United States Patent [19]

Fabre et al.

[11] Patent Number: 5,230,080
[45] Date of Patent: Jul. 20, 1993

[54] ULTRA-HIGH FREQUENCY COMMUNICATION INSTALLATION

[75] Inventors: Jean Fabre, Clermont l'Herault; Michel Charles, St Andre Sangonis, both of France

[73] Assignee: Compagnie Generale Des Matieres Nucleaires, France

[21] Appl. No.: 665,246

[22] Filed: Mar. 6, 1991

[30] Foreign Application Priority Data

Mar. 9, 1990 [FR] France ................. 90 03043

[51] Int. Cl.$^5$ ............................................. H04B 7/00
[52] U.S. Cl. ................................ 455/15; 455/49.1; 455/40; 455/55.1; 455/344
[58] Field of Search ............... 455/14, 15, 49.1, 40, 455/53.1, 55.1, 57.1, 89, 105, 344

[56] References Cited

U.S. PATENT DOCUMENTS

| | | | |
|---|---|---|---|
| 3,750,020 | 7/1973 | Baba et al. | 455/14 |
| 3,803,366 | 4/1974 | Ishii et al. | 455/55.1 |
| 3,916,311 | 10/1975 | Martin et al. | 455/14 |
| 4,012,662 | 3/1977 | Martin | 455/55.1 |
| 4,652,857 | 3/1987 | Meiksin | 455/40 |
| 4,777,652 | 10/1988 | Stolarczyk | 455/14 |
| 4,972,505 | 11/1990 | Isberg | 455/15 |
| 5,093,929 | 3/1992 | Stolarczyk et al. | 455/40 |

FOREIGN PATENT DOCUMENTS

| | | |
|---|---|---|
| 1327864 | 4/1971 | United Kingdom . |
| 1248222 | 9/1971 | United Kingdom . |

OTHER PUBLICATIONS

IEEE Transactions on Vehicular Technology. vol. VT-29, No. 3, Aug. 1980, New York U.S. pp. 305-316; Suzuki et al: "Design of a tunnel relay system with a leaky coaxial cable in an 800-MHz band land mobile téléphone system" p. 313, right Col. 1. 3-5; FIG. 20b.
IEEE International Conference on Communications '87: vol. 1, Jun. 8, 1987, New York pp. 76-80; Saleh et al.: "Distributed antennas for indoor radio communications" p. 79, left col., 1. 30-41, right col. 1. 1-7.
Patent Abstracts of Japan, vol. 5, No. 11(E-42)(683) Jan. 23, 1981, & JP-A-55 141839 (Toyo Tsuushinki) Nov. 6, 1980—all document.
IEEE Transactions on Vehicular Technology vol. VT-29, No. 3, Aug. 3, 1980, New York US pp. 305-316; Suzuki et al.
Stolarczyk et al, System Design and Performance of an MF Radio Communication System for Underground Mining, IEEE Oct. 5-9, 1988.
Proceedings of the IEEE, vol. 66, No. 1, Jan. 19, 1978 "Underground Mine Communications" by J. N. Murphy et al, pp. 26, 50.

*Primary Examiner*—Reinhard J. Eisenzopf
*Assistant Examiner*—Timothy H. Keough
*Attorney, Agent, or Firm*—Larson & Taylor

[57] ABSTRACT

A communication installation for use in a site having underground galleries, for information exchanges, comprises a repeater connected to a wired distribution network. The repeater is arranged for receiving messages which arrive over the wired network at a first frequency and for retransmitting the messages over the network at a second frequency different from the first frequency. The network comprises non-radiating cable sections, radiating cable sections capable to radiate at the second frequency and to collect radiation energy at the first frequency from a portable emitter-receiver set placed nearby. The network further comprises terminal antennae for emitting at the second frequency and collecting energy at the first frequency.

11 Claims, 2 Drawing Sheets

FIG.2.
FIG.3.
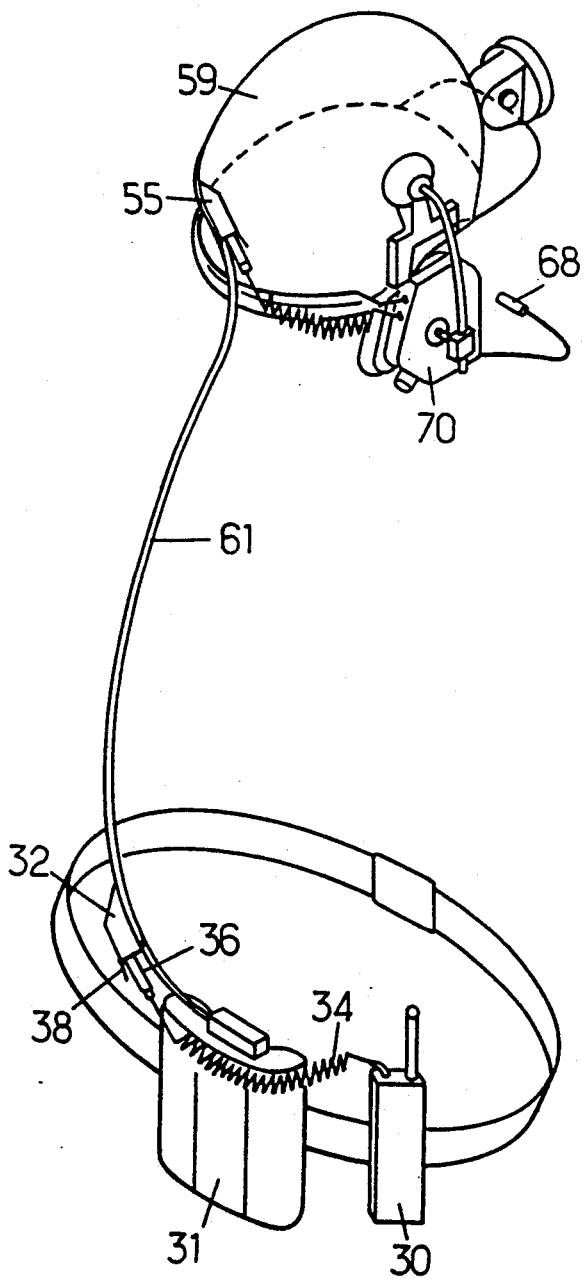
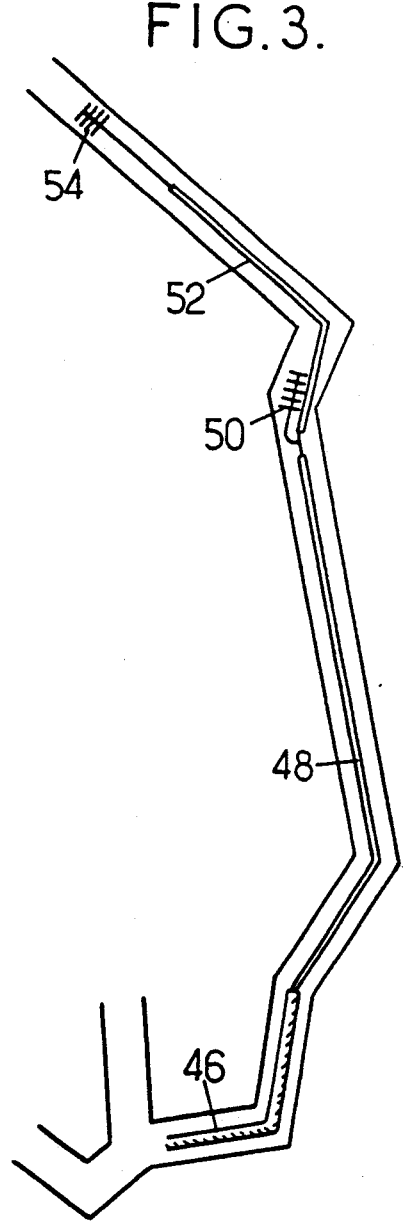

ULTRA-HIGH FREQUENCY COMMUNICATION INSTALLATION

BACKGROUND OF THE INVENTION

The present invention relates to a communication installation on sites, some portions of which are formed by underground galleries, for information exchanges between members of the personnel and typically between members of the personnel and the outside.

The invention is particularly suitable for use in mines where communications raise particular problems. The advance of the working face constantly modifies the position of the miners who are working there. The galleries often have bends which greatly attenuate microwave free propagation by UHF link. Mining regulations limit to a low value the radioelectric power radiated by the equipment.

SUMMARY OF THE INVENTION

An object of the present invention is to provide a communication installation for sites comprising underground galleries, allowing the personnel to exchange information whatever their position on the site, while only using simple means, which only radiate a low power and which can be readily adapted to the modifications of the site, for example due to the advance of the galleries.

For this, the invention provides particularly a communication installation for sites with underground galleries, comprising a transceiver apparatus connected to a wired distribution network. The transceiver apparatus constitutes a repeater having means for receiving messages which arrive over the wired network at a first frequency (f1) and means for retransmitting the received message over the network, at a second frequency (f2) different from the first one. The network comprises radiating cable sections emitting at the second frequency and collecting radiation at the first frequency from a portable set placed nearby. The network further comprises end—and possibly intermediate—antennae for emitting at the second frequency and receiving at the first frequency.

By disposing radiating cable sections in the current part of the galleries and directing the end antennae towards the working face, a possibility is given to the staff to exchange information and to send information to the repeater at all positions where it is necessary, without requiring the use of connection sockets at regular intervals in the galleries. The repeater preferably has the capability to exchange messages with the portable sets.

In practice, at least in mines, a frequency between 440 MHz and 1.2 GHz will be adopted. It is desirable to remain in the lower part of this range, so as to be able to use coaxial cables which are commercially available, more rugged than strip lines. In this frequency range, particularly in the range from 440 to 500 MHz which seems the most appropriate in mines, the directional effect of the galleries is very small and it would not be possible to adopt free propagation over large distances without an attenuation would be incompatible with the low transmitting powers required.

Although it is in principle possible to place the transceiver at any point of the network, it is of advantage to give the network an arborescent structure and to place the transceiver in a head station, each branch being by a directional coupler. The couplers will in general be of a type halving the power, although another distribution may be adopted when the branches are very different.

For simplicity, a single first carrier frequency will generally be provided. Thus, all portable sets may be frequency stabilized by identical single quartz in each set. In general, frequency modulation will be used.

In the case of large mines, divided into quarters, each quarter may comprise a separate communication installation. The low directional effect of the galleries and the low powers used make it possible to adopt the same first and second frequencies in all quarters. All transceivers may be connected to a same digital control interface for controlling analogical connections between the transceivers, for example in response to addressing by means of a keyboard and a modem provided on some at least of the portable sets. A PABX for connection with the public telephone network may be connected to the interface for access to the public network from the portable sets having a keyboard, and reciprocally.

The invention will be better understood from the following description of a particular embodiment, given by way of example. The description refers to the accompanying drawings:

BRIEF DESCRIPTION OF THE DRAWINGS

FIG. 2 shows a possible construction of portable sets which can be used with the installation of FIG. 1;

FIG. 3 shows a fraction of an installation for a gallery having bends;

DETAILED DESCRIPTION OF A PREFERRED EMBODIMENT

Figure 1:
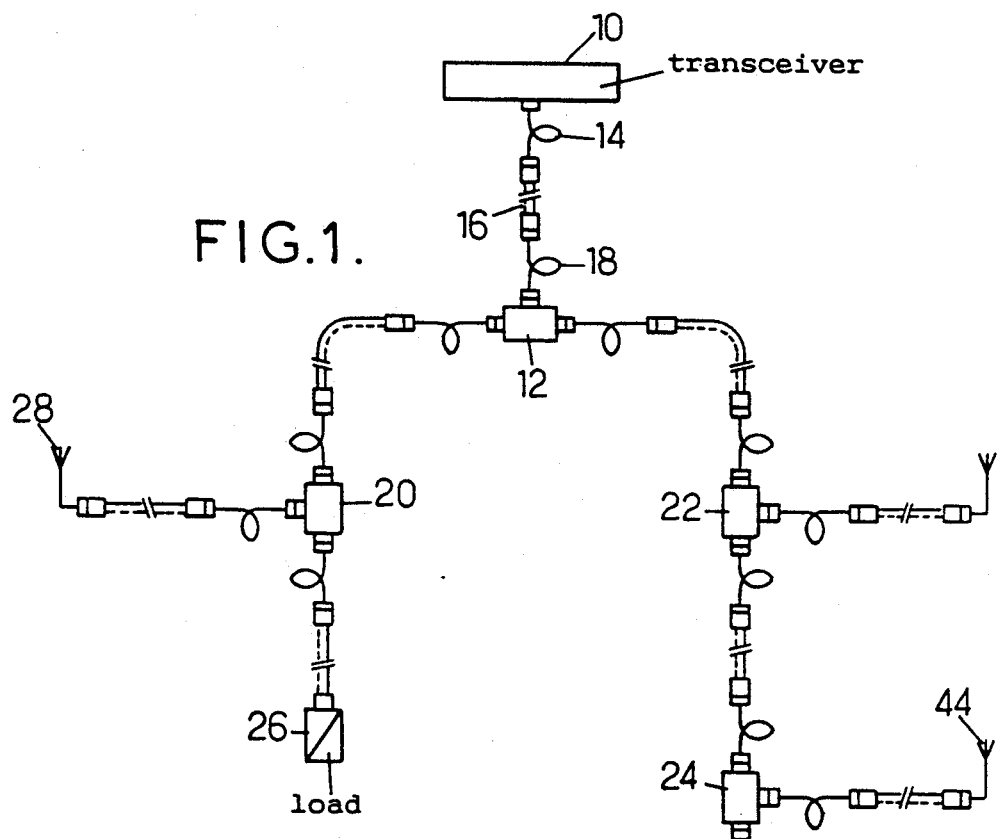
FIG. 1 is a diagram showing a possible construction of an installation according to the invention.

The installation whose general construction is shown in FIG. 1 is intended for a mine quarter which forms one particular but typical example.

The installation has an arborescent structure, from a transceiver 10 forming a repeater and which will be designated as such hereafter. Repeater 10 may be placed in the access to the mine quarters, for example in a downward shaft. The repeater does not radiate itself but feeds the arborescent network, formed by sections having different functions (broadcasting, transmission and connection). Broadcasting is provided by radiating cables and antennae; transmission is by non-radiating cables; connections involving bends are by connecting cables of a type accepting bends. The radiating cable sections will generally be laid on the upper portions of the galleries and oriented so that their emission lobe be directed towards the inside of the gallery.

As illustrated in FIG. 1, the repeater 10 is connected to a first directional coupler 12 dividing into two equal fractions the power received by a first short connecting cable 14, sufficiently flexible so as to be formed in any shape, a radiating cable section 16 and a second short connecting cable 18. All sections may be formed from commercially available coaxial cables for the frequencies usually adopted.

The diameter of the cable for forming the radiating sections is selected in function of the acceptable attenuation rate per linear meter. In most cases, a radiating coaxial cable will be used having a diameter of 16 mm, whose attenuation is 0.06 dBm per meter. If the quarter has a very large extent, a cable may be used having a diameter of 28 mm whose attenuation is only 0.036 dBm per linear meter. The connecting cables, of short length, will generally have a much smaller diameter and an appreciably higher attenuation rate.

From the coupler 12, the network comprises two branches, which branch out in turn, each time via a respective coupler 20, 22, 24 or 25. Generally, commercial couplers will be adopted, delivering an equal power on each output, although this is not indispensable. Multiple couplers may also be used placed at junctions serving more than two galleries. The network portions placed between successive couplers will not be described, for they are similar to the portion inserted between repeater 10 and coupler 12, except that some may be formed from non-radiating cable 27, in zones where broadcasting is not necessary. Such sections may be made from small diameter cable, having for example an attenuation rate of 0.16 dBm per meter.

The ends of the branches may be different depending on their position. If a branch ends in a gallery where there is no further advance, the end may be formed by a load 26 whose impedance matches that of the cable. In active galleries where the working face advances, the end is formed by an antenna such as 28 from which the propagation is free. For the frequencies usually used, a rake-shaped antenna gives satisfactory results.

The portable sets for communication exchange with the network may have the actual construction shown in FIG. 2. The set comprises an emitter-receiver 30 and a supply battery 31 which can be hooked onto the belt. A flexible connecting cable 34, coiled for example, connects the transceiver to be a socket 32. The flexible cable 34 may have an end plug 36 engaging in a female contact of the socket, which is closed, when the plug is removed, by a flap 38 preventing damp and pollutant ingress. Voice information is transmitted from socket 32 to a similar socket 55 carried by a protection helmet 59, by means of a cordon 61. The microphone 68 and ear phone may be carried by an ear-piece 70 pivotally connected to the helmet. An antenna is carried by or embodied in the housing of the emitter-receiver 30.

In practice, the amount of coupling between the radiating cable and a portable set situated nearby will be about 80 dBm. As the example hereafter shows, it is sufficient for the portable set to have a power of about 1W, i.e. 30 dBm, for providing satisfactory communication. Such a power is appreciably less than the maximum of 2W tolerated by the mining regulations.

For example in an installation of the kind shown in FIG. 1, the radiated power is lowest at the location of antenna 42. If repeater 10 has an output power of 10W (tolerable since that power is not radiated, but applied wholly to the connecting cable 14), the power distribution is, if the radiating cable sections have the cumulated lengths given below:
antenna 28: (accumulated length of 9 m+105 m40 m of radiating cable): 500 mW.
antenna 44: (cumulated length of 9 m+50 m+80 m+30 m of radiating cable): 190 mW.
antenna 42: (cumulated length 9 m+50 m+80 m+80 m of radiating cable, 70 m of non-radiating cable): 25 mW.

These indications assume that the attenuation caused by 1 m of connecting cable is 0.1 dBm and that the attenuation caused by a coupler is 3.5 dBm.

The power of the signal then decreases in the free propagation zone from the antenna up to the active face, in the work chamber.

With a repeater 30 having a current power of 10W, with a reception sensitivity of −106 dBm, the total admissible losses of a network are 146 dBm: the losses are very far from this value.

An existing network may be extended without difficulty as the working face advances as long as the available power at the antenna is compatible with the sensitivity of the portable sets used.

To extend a network branch, a coaxial cable section ending in an antenna is added. FIG. 3 shows for example an installation comprising, at the end of a radiating cable section 46, a transport coaxial cable section 48 ending in antenna 50, then a new transport coaxial cable section 52 ending in an antenna 54. The presence of the intermediate antenna 50 overcomes the consequences of the poor propagation of microwaves in binds. Furthermore, a string of intermediate antennae may be disposed along non-radiating sections.

It can be seen that the installation may be adapted to all special conditions met with. Where it is not necessary to provide communication and in zones covered by the radiation of an antenna, the installation may be made from non-radiating coaxial cable. In the infrastructures and access to zones, the connection is formed by means of radiating cables, forming both wave guide and antenna. In the vicinity of the working face, propagation takes place freely from and to an antenna.

As mentioned above, it is sufficient to have a single frequency f1 for transmitting from the portable sets towards the repeater and a single frequency for transmitting from the repeater to the sets. Frequencies f1=459.55 MHz and f2=469.55 MHz and f2 have given good results.

The transceiver is preferably provided with a telephone set and a coupler which authorizes communication between an operator at the transceiver and the sets, at frequencies f1 and f2, either in a broadcasting mode or with addressing, if each set (or some sets) have a keyboard and encoder-decoder means.

Figure 4:
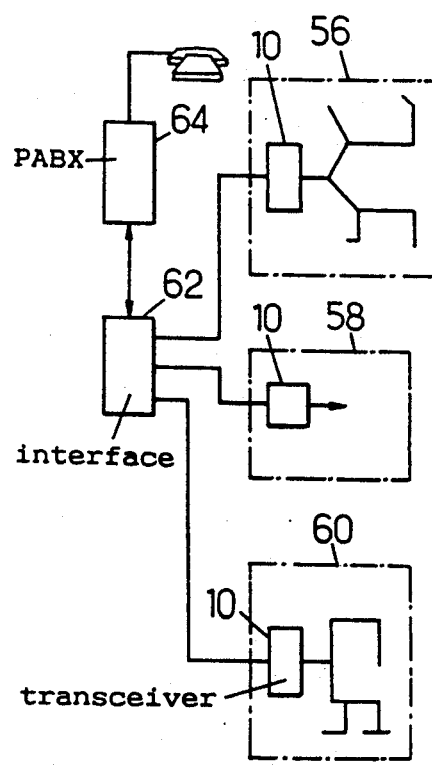
FIG. 4 shows a cooperation of several installations with the same interface for control and connection with the external telephone network.

Several installations of the above kind may be connected to a common interface for providing intercommunication between them or the outside. In the embodiment shown in FIG. 4, three installations 56, 58 and 60 are connected to a same digital-analog control interface 62. This interface may itself be connected to a PABX 64 for connection with the telephone network, allowing connection with the outside. A breakdown of interface 62 or a defect of the connections between the interface and repeaters 10 assigned to the different installations does not disturb the operation of the latter.

The presence of an interface 62 in particular allows the connection between two installations to be remotely controlled, by means of a portable set comprising a keyboard, so as to provide interinstallation conversation, i.e. to make a telephone call outside an installation.

We claim:
1. A communication installation for use on sites including underground galleries, comprising:
   a radio frequency transceiver apparatus having means for receiving messages which arrive on an input-/output port thereof at a first frequency and means for retransmitting on said input/output port the received messages at a second frequency, different from the first frequency;

a wired distribution network connected to said input-/output port, comprising a series arrangement of radiating cable sections constructed to radiate at said second frequency and to collect radiation energy at said first frequency, non-radiating cable sections and end antennae, each constructed for emitting at said second frequency and receiving at the first frequency; and a plurality of portable radio frequency emitter-receiver sets each having emitter means operating at said first frequency and receiver means operating at said second frequency.

2. Communication installation according to claim 1, wherein said sections are of coaxial cable and said first and second frequencies are of from 440 MHz to 500 MHz.

3. Communication installation according to claim 1, wherein said network has an arborescent structure and the transceiver is placed in a head station, each branching being effecting by a directional coupler halving the power it receives between two branches.

4. Communication installation according to claim 1, wherein communication is by frequency modulation.

5. Communication installation according to claim 1, wherein said network further comprises intermediate antennae located along or at an end of at least some of said non-radiating sections.

6. Communication installation according to claim 1, wherein said transceiver is further provided with means for independent communication with said portable sets at said first and second frequencies.

7. Installation according to claim 1, wherein said network further comprises flexible connecting sections constructed of coaxial cable of reduced cross-sectional area, having greater attenuation losses per unit length than said radiating section.

8. In a site including underground galleries, a communication installation comprising:

a transceiver apparatus having means for receiving messages which arrive on an input/output port thereof at a first frequency and means for retransmitting on said input/output port the received messages at a second frequency, different from the first frequency;

a wired distribution network having an arborescent structure from the input/output port of said transceiver, comprising sections of cable of such characteristics as to radiate at said second frequency and to collect radiation energy at said first frequency, and end antennae tuned for emitting at said second frequency and receiving at said first frequency, said wired distribution network being devoid of powered amplifiers and receivers; and a plurality of portable emitter-receiver sets each having a transmission power onto higher than 2W, each having emitter means operating at said first frequency and receiver means operating at said second frequency and an antenna for operation at said first and second frequencies.

9. A site according to claim 8, having a plurality of communication installations each having one said transceiver, all said transceivers being connected to mutually communicate via a common interface.

10. A site according to claim 8, wherein said transceiver is provided with means for communication with said portable sets at said first and second frequencies.

11. In a site including underground galleries, a communication installation comprising:

a transceiver apparatus having means for receiving messages which arrive on an input/output port thereof at a first frequency and means for retransmitting the received messages on said input/output port at a second frequency, different from the first frequency, said frequencies being in the range 440-500 MHz;

a wired distribution network having an arborescent structure from the input/output port of said transceiver, comprising a series arrangement of sections of coaxial cable of such characteristics as to radiate at said second frequency and to collect radiation energy at said first frequency, and non-radiating coaxial cable section having a cross-section smaller than that of said sections of radiating coaxial cables; and a plurality of portable emitter-receiver sets each having a transmission power not higher than 2W, each having emitter means operating at said first frequency and receiver means operating at said second frequency and an antenna for operation at said first and second frequencies and direct coupling with said sections of radiating coaxial cable.

* * * * *